(12) United States Patent
O'Connell et al.

(10) Patent No.: US 10,748,728 B2
(45) Date of Patent: *Aug. 18, 2020

(54) BOOM MOUNTABLE BREAKER AND METHODS OF USING SAME

(71) Applicant: Quanta Associates, L.P., Houston, TX (US)

(72) Inventors: Daniel Neil O'Connell, Oliver (CA); David Karl Wabnegger, Langley (CA)

(73) Assignee: Quanta Associates, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/363,731

(22) Filed: Mar. 25, 2019

(65) Prior Publication Data
US 2019/0221393 A1 Jul. 18, 2019

Related U.S. Application Data

(63) Continuation of application No. 15/475,689, filed on Mar. 31, 2017, now Pat. No. 10,242,830.
(Continued)

(51) Int. Cl.
| | |
|---|---|
| *H01H 71/10* | (2006.01) |
| *H02G 1/02* | (2006.01) |
| *H01H 71/02* | (2006.01) |
| *H02G 1/04* | (2006.01) |
| *B66C 23/66* | (2006.01) |
| *B66C 1/42* | (2006.01) |

(52) U.S. Cl.
CPC ........ *H01H 71/0264* (2013.01); *H01H 71/10* (2013.01); *H02G 1/02* (2013.01); *H02G 1/04* (2013.01); *B66C 1/42* (2013.01); *B66C 23/66* (2013.01)

(58) Field of Classification Search
CPC ...... H01H 71/0264; H01H 71/10; H02G 1/00; H02G 1/02; H02G 7/00; H02G 5/00; B66C 23/66; B66C 1/00; B66C 1/10; B66C 1/68; B66C 25/00; B66C 2700/062; B66C 3/00; B66C 3/20
USPC .................. 200/331; 254/134.3 PA, 134.3 R; 269/903
See application file for complete search history.

(56) References Cited

U.S. PATENT DOCUMENTS

| | | | |
|---|---|---|---|
| 4,103,121 A * | 7/1978 | Rogers ..................... | H01H 3/30 200/48 A |
| 10,242,830 B2 * | 3/2019 | O'Connell ......... | H01H 71/0264 |

* cited by examiner

*Primary Examiner* — Vanessa Girardi
(74) *Attorney, Agent, or Firm* — Oathout Law Firm; Mark A. Oathout; Antony C. Edwards

(57) ABSTRACT

A boom mountable breaker system and a method of using same for interrupting electrical transmission through a portion of an energized conductor downstream of a desired break location. The method includes: mounting the jumper onto the energized conductor across the desired break location so as to form an electrically conductive first parallel electrical path; installing an in-line opener in the energized conductor at the desired break location on the energized conductor; positioning the breaker at the desired break location on the energized conductor, and electrically connecting the breaker, while open, across the desired break location and across the opposite ends of the jumper so as to form a second parallel electrical path when the breaker is closed; closing the breaker to thereby complete the second parallel electrical path; removing the jumper from across the desired break location; and, opening and then removing the breaker.

3 Claims, 16 Drawing Sheets

Related U.S. Application Data

(60) Provisional application No. 62/316,232, filed on Mar. 31, 2016.

BOOM MOUNTABLE BREAKER AND METHODS OF USING SAME

FIELD OF INVENTION

This disclosure generally relates to overhead power transmission lines. In particular, the disclosure relates to a boom mountable breaker and methods of using same for working on overhead power transmission lines.

BACKGROUND

Electric power transfer systems use one or more phases of conductors to transfer electric current within a grid. The conductors may be used for bulk transmission from a power generating plant to centers of high demand and for distribution within the centers of high demand. The conductors are supported above the ground by support structures, including towers, which are usually of metal lattice construction, and poles, which maybe of wood, cement or steel (collectively referred to herein as support structures).

Over time one or more parts of the electric power transfer system may require maintenance or the installation of new equipment. For example, one or more sections of the conductors may require repair or replacement. One or more of the support towers may also require repair or replacement. Additionally, new equipment, such as sub-stations may be added to the system. For the safety of workers and equipment, the flow of electrical current is often shut off before maintenance, construction or other operations are performed.

U.S. Pat. No. 7,535,132 entitled "Live Conductor Stringing and Splicing Method and Apparatus" describes a variety of approaches that address working on live conductors.

SUMMARY

The present invention provides an apparatus for interrupting electrical transmission through conductors that includes using a boom mounted breaker. In one embodiment, a boom mounted breaker is mounted on an extendible and retractable arm that is rotatably connected to a vehicle. A support base may be pivotally connected to the arm at the end of the arm distal from the vehicle, and the breaker mounted on the support base. The breaker is actuable between a closed position and an open position. When in the closed position the breaker is a conductor and when in the open position the breaker is an insulator. Actuation and pivoting of the breaker is remotely controlled by an operator. Advantageously, the pivoting of the support base is at least in a vertical plane.

Another embodiment of the present invention provides a boom mountable breaker for mounting on the end of a boom, the boom mountable breaker includes: a boom adaptor mountable onto the end of the boom, a platform pivotally mounted onto the boom adaptor for pivoting in at least a vertical plane, a selectively actuable actuator mounted to, so as to cooperate between, the boom adaptor and the platform, whereby actuation of the actuator selectively pivots the platform relative to the boom adaptor. A selectively operable electrical circuit breaker is mounted on, so as to be electrically insulated and upstanding from, the platform.

Another embodiment of the present invention provides a method that interrupts the transmission of electricity through a section of a power transfer system, wherein an in-line opener has been installed in the energized conductor at a desired break location by using a jumper to form a first parallel electrical path. The method comprises the steps of positioning the breaker proximal to the live conductor, and electrically connecting the breaker in an open position across the desired break location, including across both the in-line opener and jumper, and then closing the breaker so as to form a second parallel electrical path. The inline opener prevents the transmission of current load, so that, once the jumper is then removed, the breaker may be opened to safely interrupt the electrical transmission on a high voltage conductor. The breaker may then be removed.

Another embodiment of the present invention provides a method of using a boom mountable breaker for selectively interrupting electrical transmission in a portion of an energized conductor, wherein, the method comprises the steps of providing: (i) a boom adaptor mountable onto the end of a boom, (ii) a platform pivotally mounted onto the boom adaptor, (iii) a selectively actuable actuator mounted to, so as to cooperate between, the boom adaptor and the platform, whereupon actuation of the actuator selectively pivots the platform relative to the boom adaptor, (iv) a selectively operable electrical circuit breaker mounted on, so as to be electrically insulated and upstanding from, the platform; mounting the boom adaptor onto the end of a boom; positioning the circuit breaker using the actuator and boom into a position proximal the portion of the energized conductor to be interrupted; with the circuit breaker in an open, non-electrically conducting condition, electrically connecting the circuit breaker to upstream and downstream positions on the energized conductor so as to bridge the circuit breaker across the segment of the energized conductor to be interrupted at the desired break location, and across an in-line opener on the conductor at the desired break location and the installed jumper used to install the in-line opener; closing the circuit breaker; then removing the jumper, and then opening the breaker thereby electrically interrupting the downstream portion of the conductor.

The present invention may allow for a safer and quicker interruption of electrical transmission by positioning the breaker proximal to the energized conductor. For example, electrical connection of the breaker to the energized conductor requires shorter lengths of conductive connecting wires, which are easier to handle safely in comparison to wires that extend to the surface below the energized conductor wherein a circuit breaker is mounted on a ground level trailer. Furthermore, shorter lengths of conductive connecting wires may be more easily handled in a safe manner when they are disconnected from the energized conductor.

BRIEF DESCRIPTION OF DRAWINGS

Various examples of the apparatus are described in detail below, with reference to the accompanying drawings. The drawings may not be to scale and some features or elements of the depicted examples may purposely be embellished for clarity. Similar reference numbers within the drawings refer to similar or identical elements. The drawings are provided only as examples and, therefore, the drawings should be considered illustrative of the present invention and its various aspects, embodiments and options. The drawings should not be considered limiting or restrictive as to the scope of the invention.

DETAILED DESCRIPTION

Figure 1:
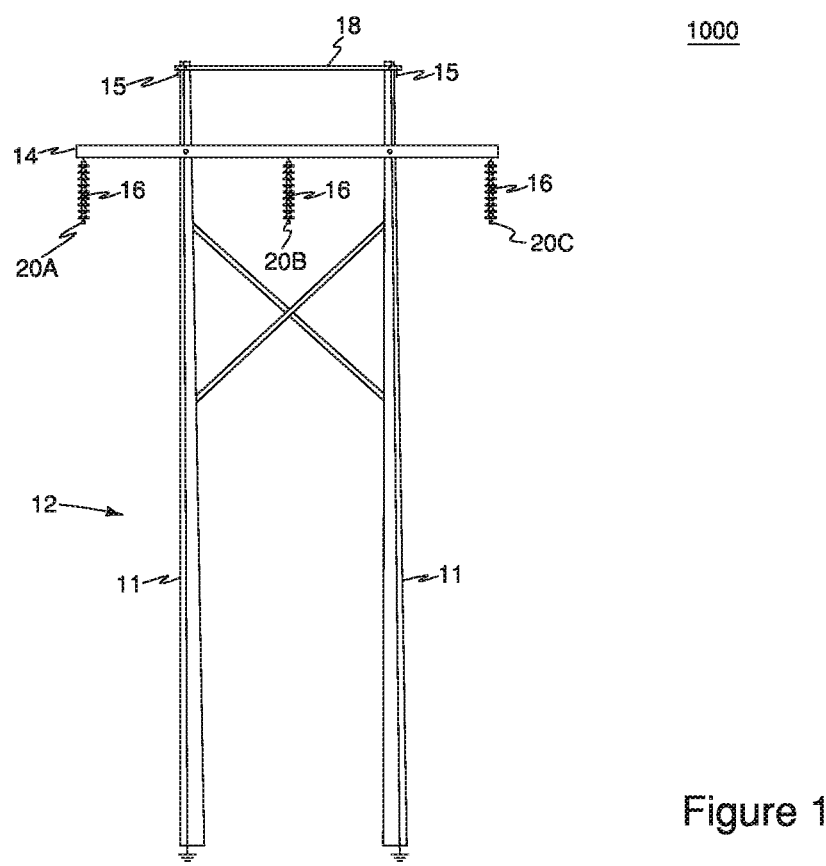
FIG. 1 is front elevation view of an example support tower for supporting conductors and static wires of an overhead power line system.

FIG. 1 depicts an example support structure 12 that is used in an electric power transfer system 1000. The electric power transfer system 1000 may comprise one or both of transmission systems or distribution systems. Support structures 12 may also be support poles, towers, pylons or other structures all of which are referred to herein collectively as support structures. The support structure 12 is depicted as comprising two support poles 11, but this is not intended to be limiting. For example, the support structures 12 may comprise a single support pole, multiple support poles, latticed support towers or combinations thereof, as would be known to one skilled in the art. The support structure 12 has a cross arm 14 that supports an insulator or insulators 16 from which a conductor 20 is supported.

FIG. 1 depicts three phases of conductors 20; namely, conductors 20A, 20B, and 20C. Each conductor 20 is supported by at least one corresponding insulator 16 and each conductor 20 may or may not be energized with flowing electric current and/or have a voltage potential. Energized conductors 20 may also be referred to as hot, live or electrified. While FIG. 1 depicts three phases of conductors 20, this is not intended to be limiting, as there may be one, two, three, or more phases of conductors 20. FIG. 1 also depicts the three phases as being spaced from one another in a horizontal plane with a single conductor 20 for each phase, this is not intended to be limiting. For example, the overhead power transfer system 1000 may comprise phases that are spaced apart in a vertical or non-vertical plane and each phase may comprise multiple conductors 20.

When the conductors 20 are energized the conductors 20 conduct high-voltage electricity (for example, above 69 kV or more) for bulk transmission of power from a power plant to both high demand sub-stations and rural sub-stations.

The support structure 12 may also include an upper portion 15 that supports one or more static lines 18, which may also be referred to as optic lines or shielding lines. Typically, the static lines 18 are not energized. Rather, the static lines 18 provide protection from lighting strikes and, optionally, they may be or include fiber optic cables that are used to transfer optical signals.

Figure 2:
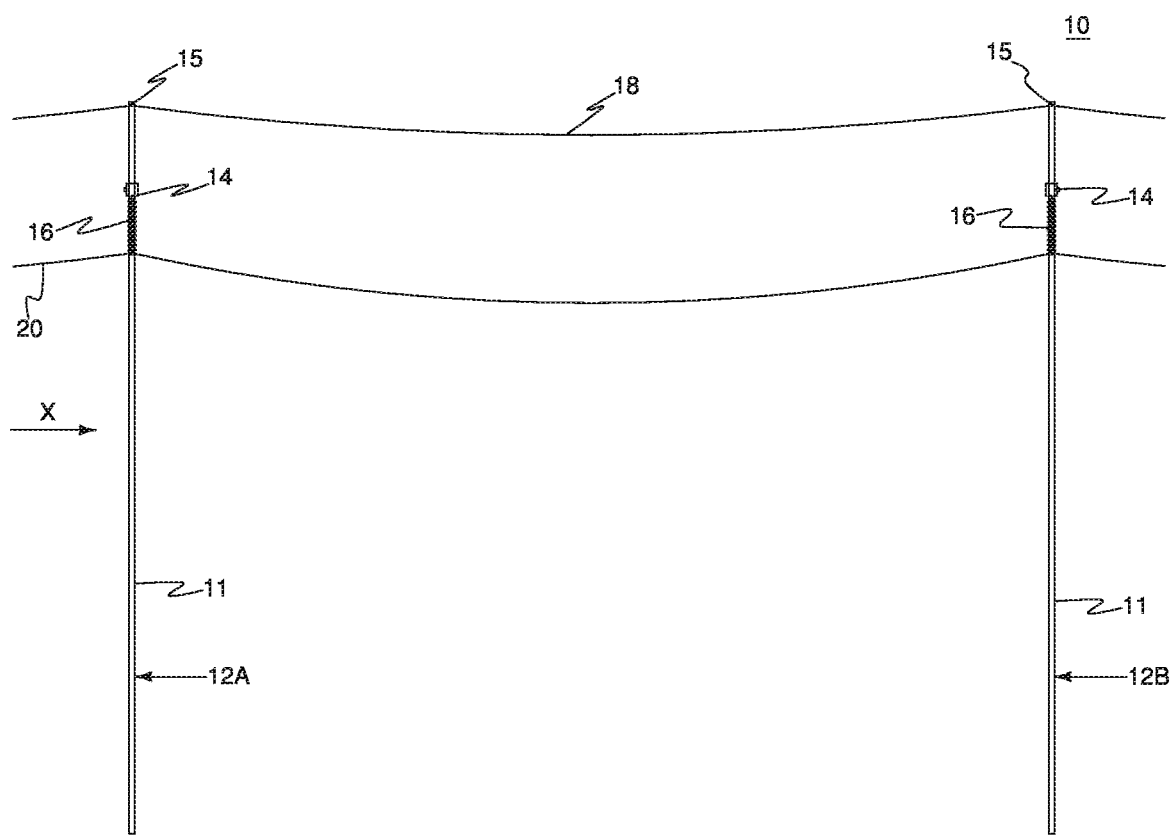
FIG. 2 is the diagrammatic, side elevation view of two example support towers that support a conductor therebetween and form a section of the overhead power line system of FIG. 1.

FIG. 2 is a side elevation view of a section 10 of the electric power transfer system 1000. The section 10 is depicted, without intending to be limiting, as including two support structures 12A and 12B that support one or more conductors 20 and one or more static lines 18 therebetween. Support structures 12A and 12B may comprise the same features of one or more support poles 11, a cross arm 14, an insulator 16 and an upper portion 15, or not. The section 10 may comprise one or more phases of conductors 20 and one or more static lines 18.

Arrow "X" indicates the direction that electrical current is being transferred through the section 10, from support structure 12A to support structure 12B. Electric current enters the section 10 first at an upstream end of the section 10 near to the support tower 12A and then exits the section 10 at a downstream end of the section 10, which may be near the support tower 12B. The upstream end of the section 10 may also be referred to as the load end. The distance between the two support towers 12A, B may be in the order of tens of meters to hundreds or thousands of meters.

Often times it is desired to stop the flow of electric current through the section 10. For example, maintenance operations may be required on the overhead power transfer system 1000 at a portion that is downstream of the section 10 or it may be necessary to install new equipment downstream of the section 10. Therefore, it is desirable to stop the flow of current for the safety of the line workers. Various embodiments of the present invention comprise the use of a circuit breaker to create an alternate circuit for the purpose of stopping the flow of current through the section 10.

Figure 3:
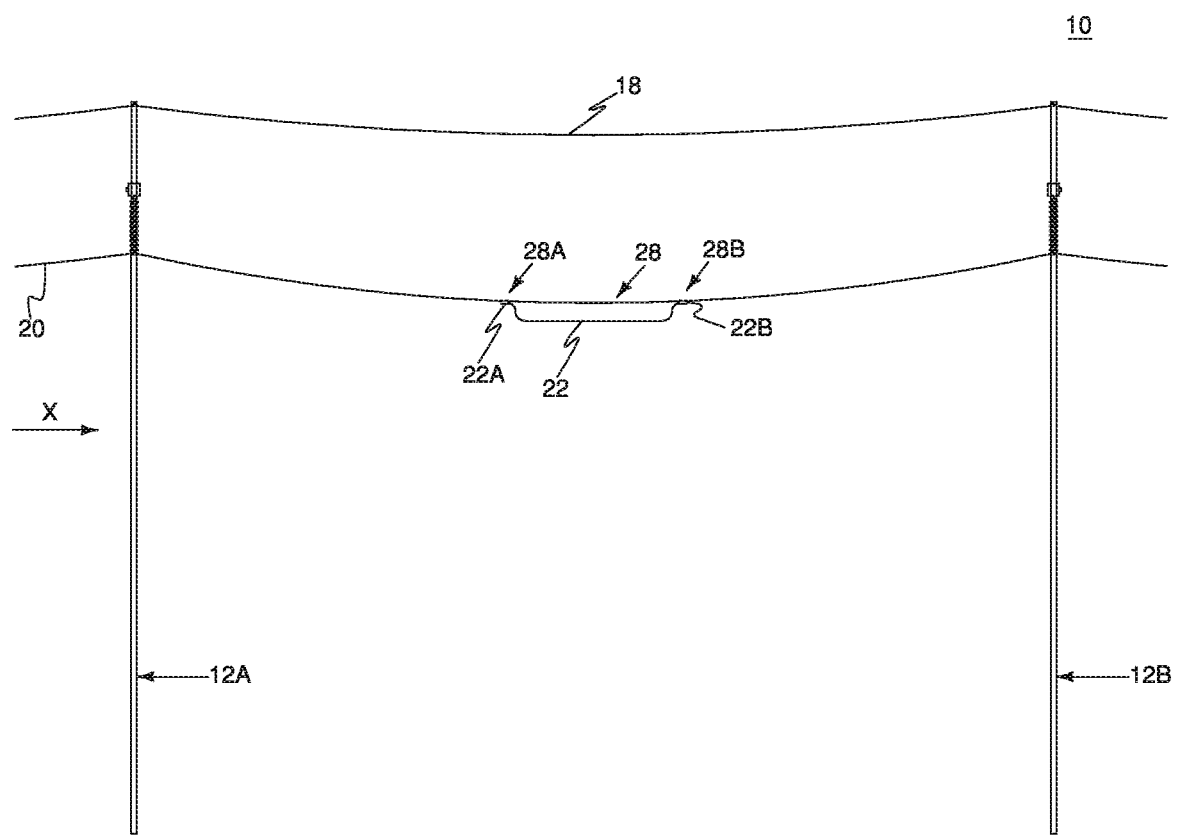
FIG. 3 is the diagrammatic, side elevation view of FIG. 2 showing the installation of a jumper line.

FIG. 3 depicts a step of connecting a jumper 22 to the conductor 20 within section 10. The jumper 22, which may also be referred to as a jumper line, and may be rated based upon the ability to conduct the entire current load that is flowing through the section 10. In an alternative option, the jumper 22 may be rated to only conduct a portion of the entire current load that is flowing through the section 10 and more than one jumper 22 may be used. When installed, the jumper 22 is electrically connected to the conductor 20 to define a first alternate circuit 28. The first alternate circuit 28 has an upstream end 28A and a downstream end 28B. Similarly, the jumper 22 has an upstream end 22A and a downstream end 22B. Typically the conductor 20 is energized and, therefore, the jumper 22 can be installed using hot sticks or other live-line techniques. In some instances, however, it may be that the conductor 20 is not energized, for whatever reason, when the jumper 22 is installed and live-line techniques may not be required, keeping in mind that live-line techniques may still be employed if the possibility exists of an induced voltage in the non-energized line. Using techniques known by those skilled in the art, the ends of jumper 22 may be removably installed across where it is desired to install an inline opener 24 in section 10 so that the jumper 22 may subsequently be detached from the conductor 20. The length of jumper 22 may depend upon the physical characteristics of the section 10, such as the distance and terrain between the support structures 12A, B. The length of jumper 22 may also depend upon the electrical characteristics of the section 10, such as the current load and voltage within the section as would be known to one skilled in the art. The jumper 22 must be long enough to allow the installation of the insulated inline opener 24 seen in FIG. 4. Jumper 22 is removably connected using conventional removable connectors such as bolted clamps, etc.

Figure 4:
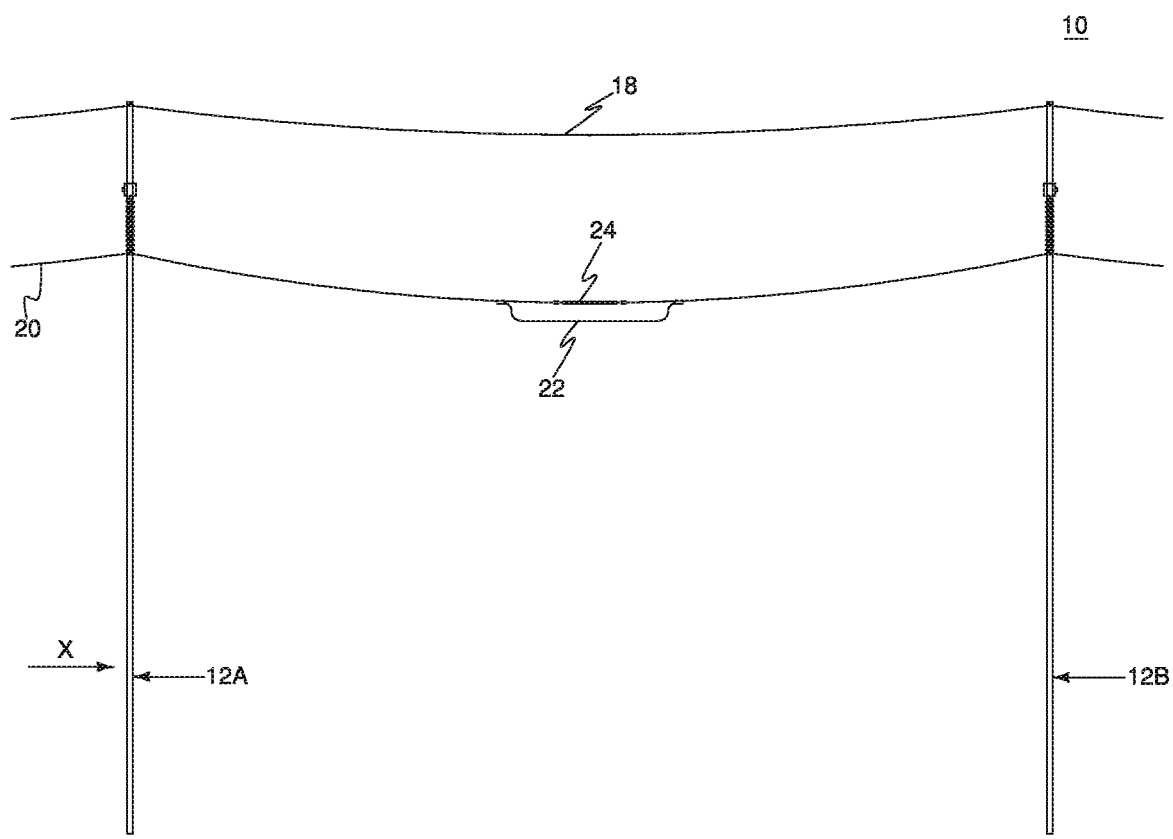
FIG. 4 is the diagrammatic, side elevation view of FIG. 3 showing the installation of an electrically insulated inline opener.

FIG. 4 shows a step of installing the insulated inline opener 24 on the conductor 20 between the upstream and downstream ends 22A, B of the jumper 22. The insulated inline opener 24 may made up of one or more dielectric materials such as, but not limited to, a polymer, a blend of multiple polymers, ceramic or a combination thereof. In a preferred embodiment the insulated inline opener 24 is a polymer insulator that prevents the transmission of current load within the section 10.

When the inline opener 24 is installed on the conductor 20, the entire current load flows through the first jumper 22 around the inline opener 24, such as via the first alternate circuit 28. In addition to providing the first alternate circuit 28, the jumper 22 provides to a worker working in the section 10 a visual cue that the first alternate circuit 28 has been established.

At high voltages (for example, above 69 kV or more), due to arcing, it may be unsafe to merely disconnect the jumper 22 from the conductor 20 to interrupt current flow or transmission of current load through section 10. Further, given sufficient high voltages, it may even be impossible to directly electrically disconnect the jumper 22 from the conductor 20 due to the arcing.

Figure 5:
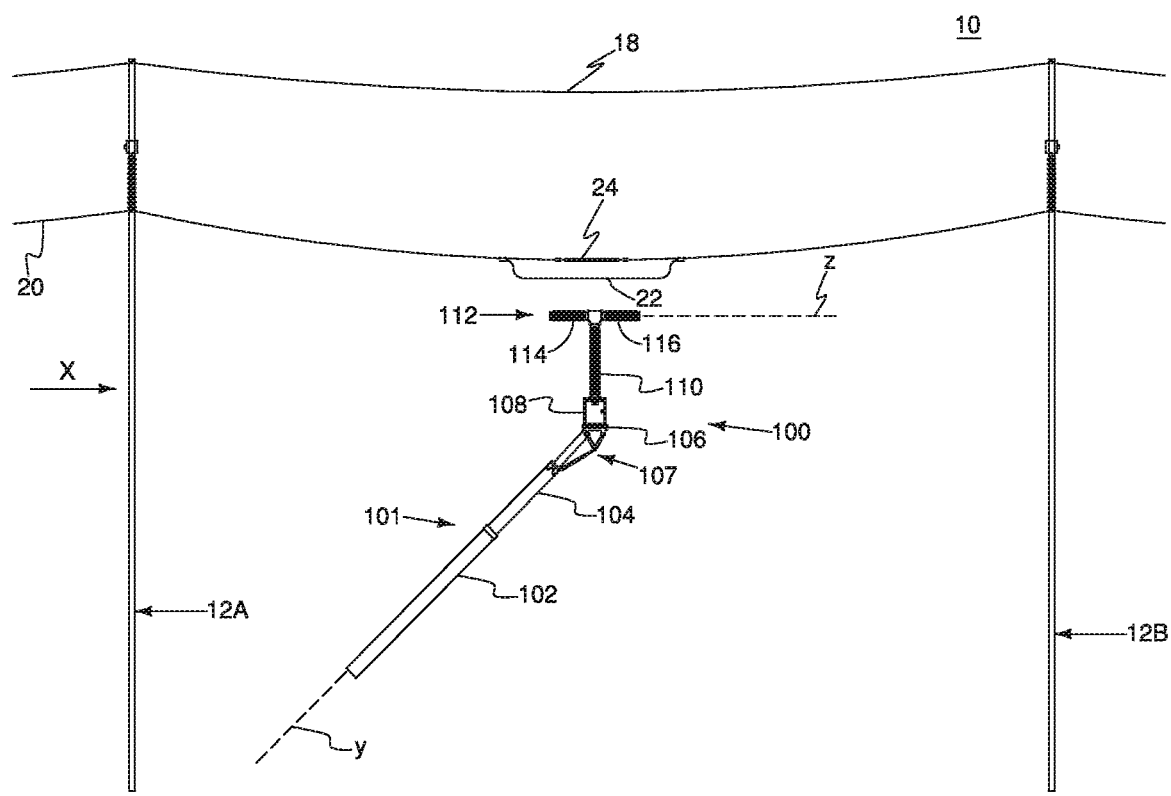
FIG. 5 is the diagrammatic, side elevation view of FIG. 4 showing the positioning of a first boom mounted breaker below the jumper line.

FIG. 5 depicts a step of positioning of a first breaker 100, into the section 10, proximal to the conductor 20. It is understood that the first breaker 100 may be positioned below, and/or to the side, substantially level with, laterally of the conductor 20, or adjacent combinations thereof. In a preferred embodiment, the first breaker 100 is positioned close, at a distance not less than the minimum approach distance (MAD), to the conductor 20, so that long lengths of conductive connecting wire (such as for example would be required to reach a circuit breaker positioned on a truck or trailer) are not required to electrically connect the first breaker 100 to the conductor 20. The MAD is well known to those skilled in the art.

The first breaker 100 is mounted on the distal end of a boom 101, which provides a support for a breaker platform or base 106, that in the illustrated embodiment not intended to be limiting, comprises a lower portion 102, an upper portion 104 and a support base 106. The boom 101 may be connected at one end of the lower portion 102 to a vehicle, such as a truck or trailer (not shown). In one embodiment, the boom 101 may be rotatably connected to the vehicle by a rotating pedestal or other known apparatus. The lower portion 102 may comprise one or more extendible and retractable sections that may be telescopically arranged with each other, for changing the axial length of the boom 101. For example, the length of the lower portion 102 may increase or decrease along a longitudinal axis of the boom 101 (see broken line "Y" in FIG. 5). The upper portion 104 may be connected to the lower portion 102, opposite from the vehicle. Preferably, the upper portion 104 is made of, or coated in, a dielectric material. The dielectric material prevents electric current from being conducted along or through the upper portion 104. Optionally, the upper portion 104 may also comprise extendible and retractable sections that move along the longitudinal axis of the boom 101.

The support base 106 is connected to the distal end of the upper portion 104, opposite to the lower portion 102, for example by means of a boom adaptor 106a. The support base 106 is able to pivot into various positions relative to the longitudinal axis of the boom 101. The first breaker 100 is mounted to the support base 106 so as to be upstanding therefrom.

The position of the boom 101 may be controlled remotely by an operator. For example, the position of the boom 101 relative to the vehicle can be changed, as can the axial length of the boom 101. Furthermore, the operator can change the position of the support base 106 relative to the upper portion 104. For example, the support base 106 may be rotated by a scissor linkage 107 mounted along boom adaptor 106a. The scissor linkage 107 may include one or more actuators 107a, whose actuation can be selectively controlled hydraulically, or otherwise, acting on the common hinged joint 107b between linkage members 107c, as would be known to one skilled in the art. As will also be appreciated by those skilled in the art, changing the position of the support base 106 relative to the upper portion 104 may be achieved by methods and means that are not limited to the scissor linkage 107. For example, various other pivots, hinges, actuators, telescopic or sliding arrangements or combinations thereof may also be used.

Positioning of the boom 101 may be controlled by a control system (not shown) which may consist of a hydraulic system (not shown) having hydraulic hoses and valves. For example, the hydraulic system may fluidly connect an auxiliary hydraulic port of the vehicle, the lower portion 102 and the support base 106. The control system may be remotely operated by means of digital radio signals, fiber optic cables, or other suitable insulated control means.

U.S. Pat. No. 5,538,207 "Boom-mountable Robotic Arm" and U.S. Pat. No. 8,684,333 entitled "Boom Mountable Robotic Arm", the entire disclosures of which are incorporated herein by reference, both describe booms that are suitable for use as the boom 101 in the present invention.

The first breaker 100 can be actuated between a closed position and an open position. When in the closed position the first breaker 100 comprises electrical contacts that are in direct contact with each other and can conduct the electric current that is flowing through the section 10 without generating unacceptable amounts of resistance or heat. When in the open position, the electrical contacts within the first breaker 100 are physically separated and any arcing therebetween has been suppressed so that the first breaker 100 acts as an electrical insulator that does not conduct electric current. Actuation of the first breaker 100 between the closed and open positions is controlled remotely, and may be manually controlled or it may be automatically controlled. In a preferred embodiment, actuation of the first breaker 100 is manually controlled remotely, as seen by way of example in FIG. 9, by the operator to permit or stop the flow of current through the first breaker 100 as desired.

Figure 9:
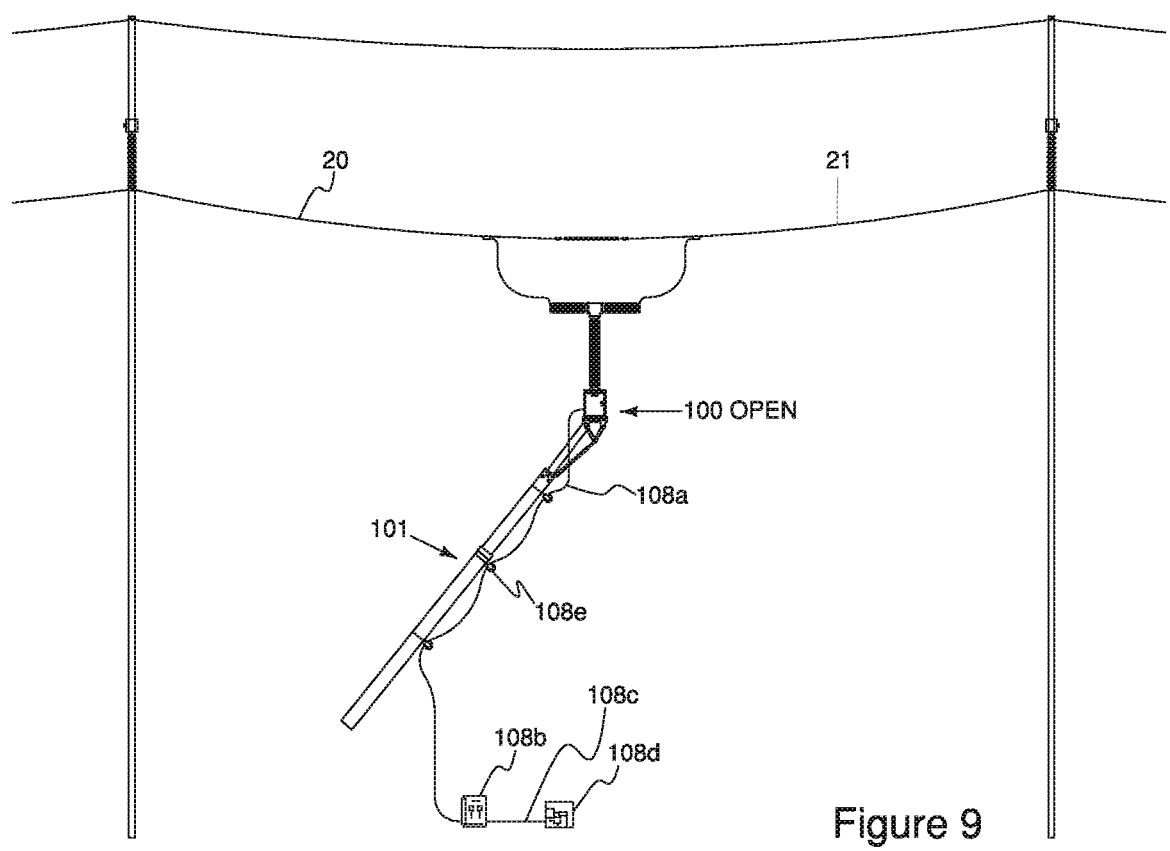
FIG. 9 is the diagrammatic, side elevation view of FIG. 8 showing the first boom mounted breaker in the open position for de-energizing a downstream portion of the conductor.
Figure 9A:
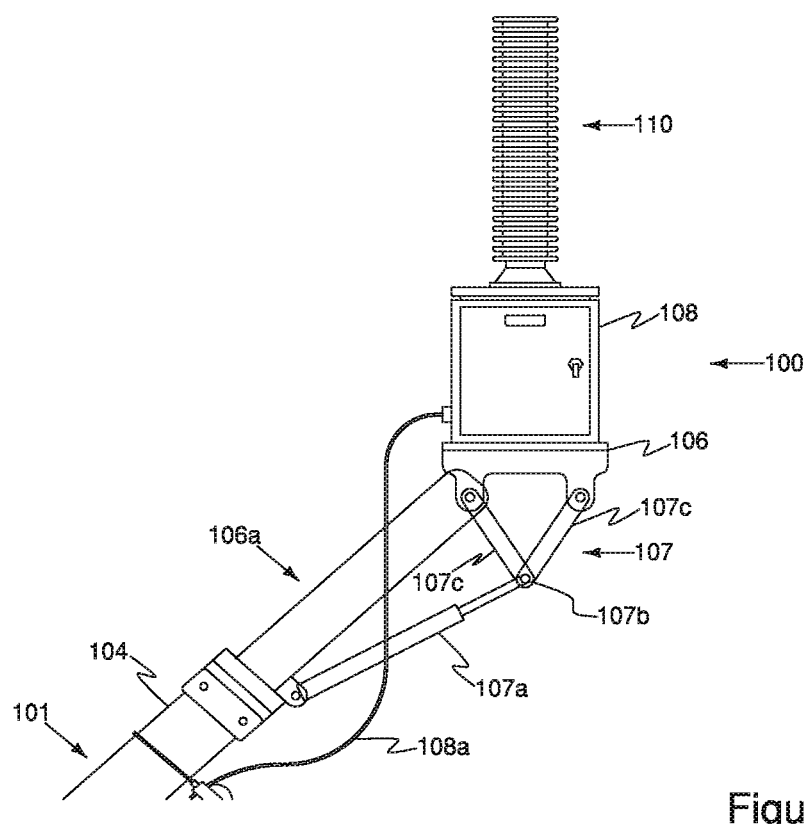
FIG. 9a is an enlarged view of a portion of FIG. 9.
Figure 15:
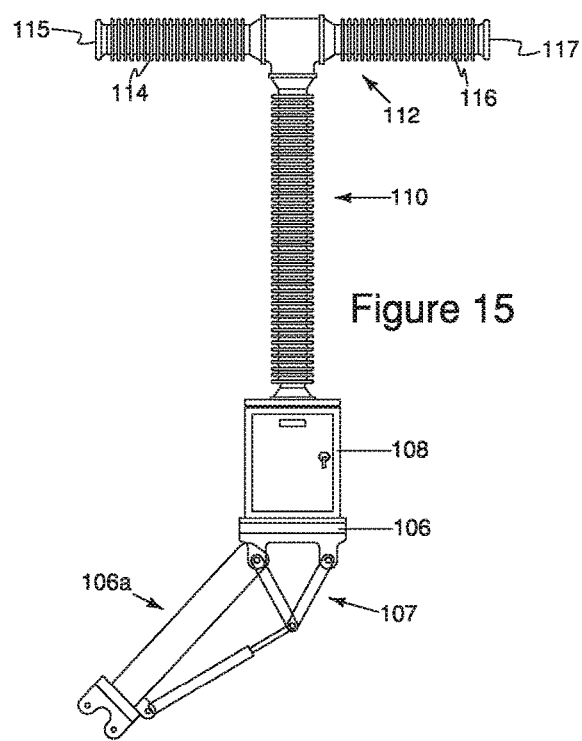
FIG. 15 is a side elevation view of the first boom mounted breaker.

FIG. 5 and corresponding magnified views provided in FIGS. 9a and 15 each depict one embodiment of the first breaker 100 that comprises a boom-mounted control box or housing 108, a support insulator 110, a breaking or breaker unit 112, as used interchangeably herein, or interrupter, having terminals 115, 117 at the ends thereof.

The boom-mounted control box or housing 108 contains an actuating mechanism (not shown) for actuating the first breaker 100 between the open and closed positions. For example, the actuating mechanism may be a single motion or a double motion design that may be selected from, but not limited to, the following: an energy storage mechanism, such as a spring; a driven mechanism, such as an electric motor, a hydraulic motor, a pneumatic-based mechanism; or combinations thereof.

The support insulator 110 insulates the breaking unit 112 and the terminals 115, 117 from earth ground. The support insulator 110 may be a hollow body made of porcelain, or a dielectric composite, that may contain $SF_6$.

The breaking unit 112 houses the electrical contacts of the first breaker 100 and the moving components that couple electrical contacts with the mechanism within the housing 108. The breaking unit 112 may comprise an extinguishing mechanism for extinguishing any arcing between the electrical contacts when the first breaker 100 is actuated to the open position. For example, the extinguishing mechanism may be a $SF_6$ puffer design, a $SF_6$ self-blast design or other types of known extinguishing mechanisms. In one embodiment, the breaking unit 112 comprises an upstream breaking portion 114 and a downstream breaking portion 116. Optionally, the upstream and downstream breaking portions 114, 116 are substantially co-axially aligned with each other along a common longitudinal axis (shown as broken line "Z" in FIG. 5) that is substantially perpendicular to the support insulator 110. This embodiment of the first breaker 100 may also be referred to as a "T breaker". Each of the breaking portions 114, 116 are made of porcelain, or a composite material, and filled with pressurized $SF_6$ gas. Because the terminals 115, 117 are positioned on either end of the breaking unit 112, the breaking unit 112 can become live and subject to voltage and current when the first breaker 100 is closed and electrically connected with the conductor 20.

Figure 6:
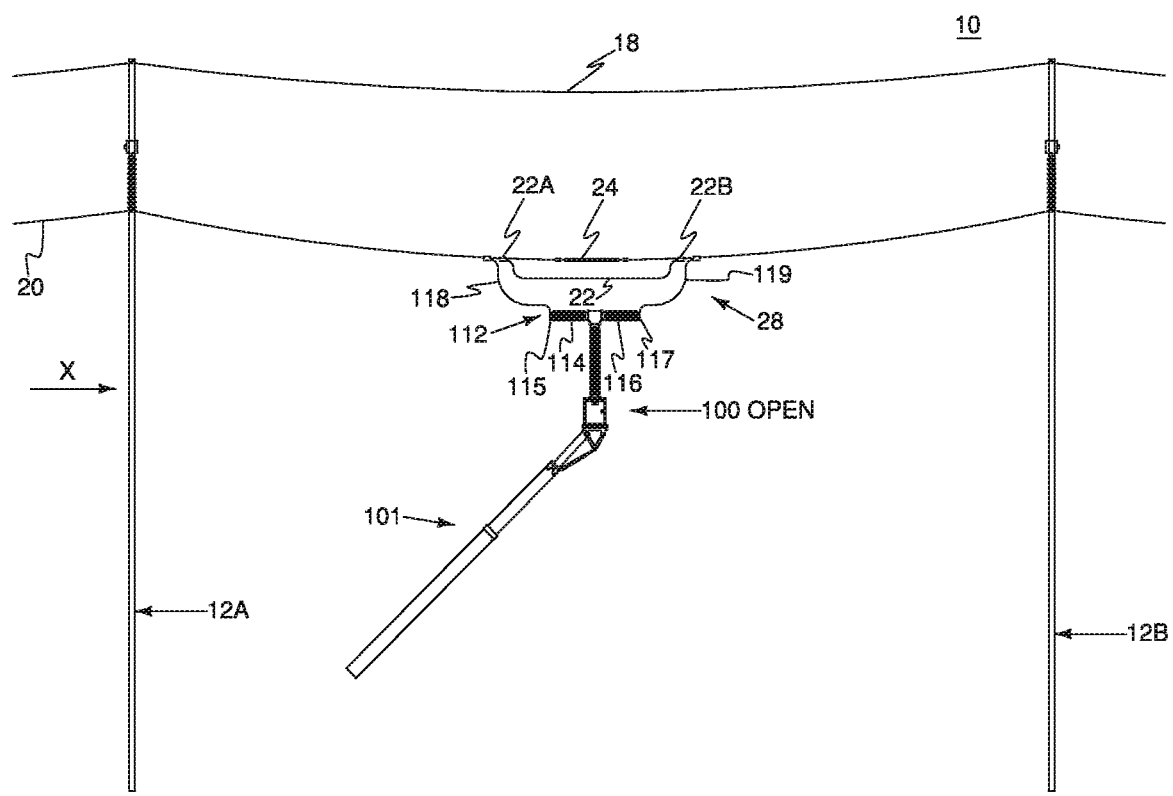
FIG. 6 is the diagrammatic, side elevation view of FIG. 5 showing the connecting of the conductor to the first boom mounted breaker, with the breaker in an open position.

FIG. 6 depicts a step of electrically connecting the first breaker 100 to the conductor 20. This step is preceded by a step of confirming that the first breaker is in the open position. In FIG. 6, the first breaker 100 is in an open position and it does not conduct electric current. A conductive connection jumper or wire 118 is connected to the upstream terminal 115 of the first breaker 100 and to the conductor 20, upstream of the upstream end 22A of the jumper 22. Another conductive connection jumper cable or wire 119 is connected to the downstream terminal 117 and the conductor 20, downstream of the downstream end 22B of the jumper 22. The conductive connection wires 118, 119 may also be rated to handle the voltage and current load within the section 10. For example, the gauge of conductive connection wires 118, 119 may be the same as the jumper 22.

Figure 7:
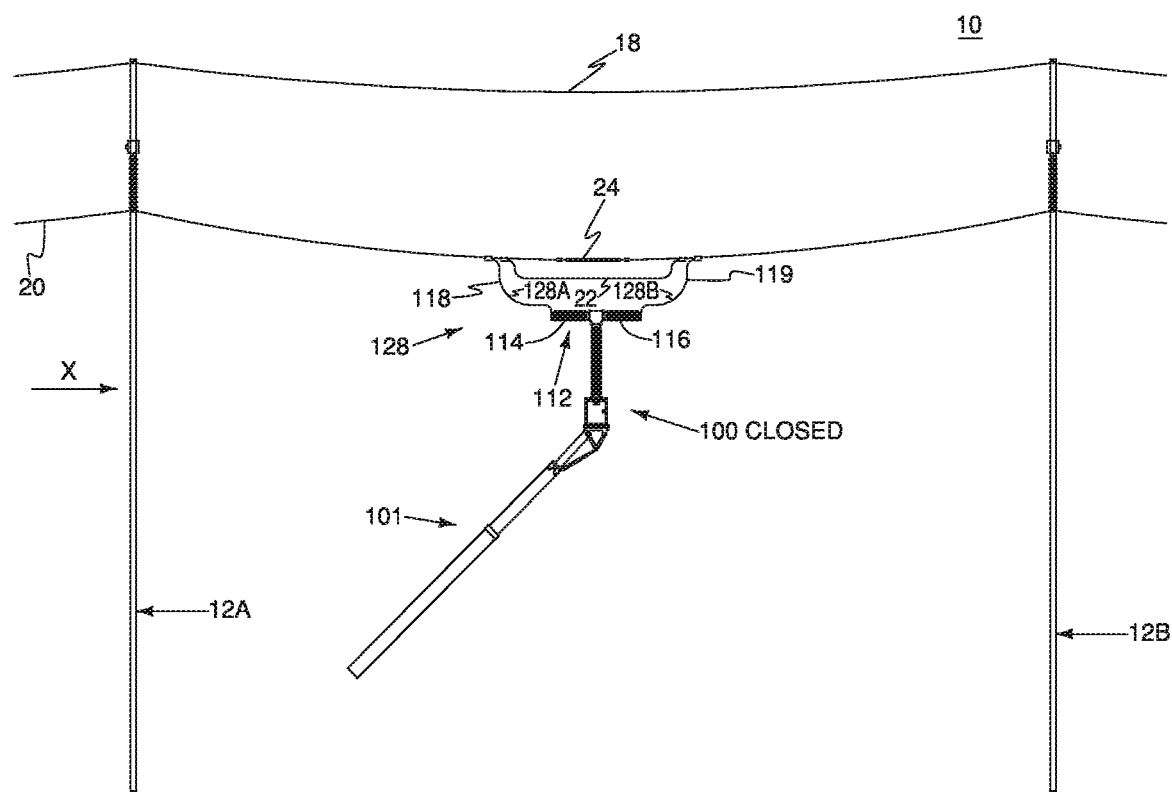
FIG. 7 is the diagrammatic, side elevation view of FIG. 6 showing the first boom mounted breaker in a closed position.

FIG. 7 depicts a step of actuating the first breaker 100 to the closed position. In the closed position, electric current can be conducted through the first breaker 100. Together, the conductive connection wires 118, 119 and the first breaker 100 define a second alternate circuit 128. The second alternate circuit 128 has an upstream end 128A and a downstream end 128B. The second alternate circuit 128 is parallel to the first alternate circuit 28 and thus at least a portion of the current load in the system 10 diverts through the second alternate circuit and around the first alternate circuit 28 and the inline opener 24.

Figure 8:
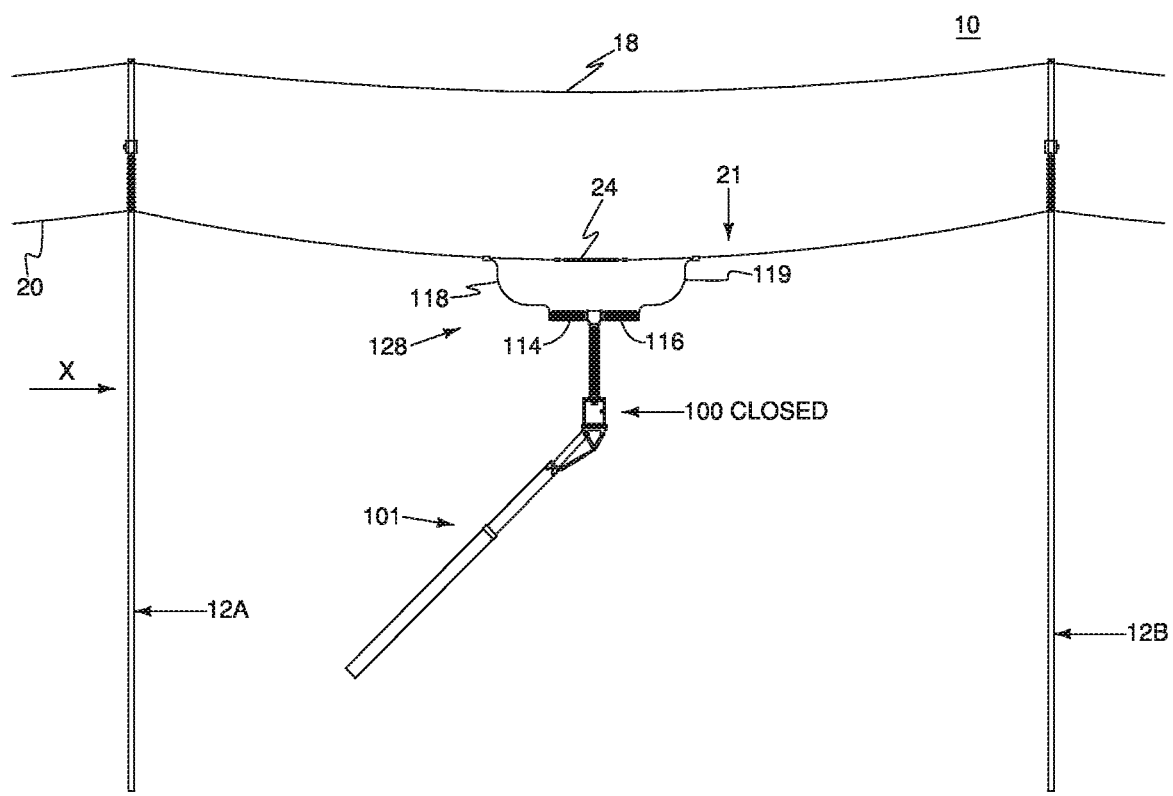
FIG. 8 is the diagrammatic, side elevation view of FIG. 7 showing the removal of the jumper line.
Figure 10:
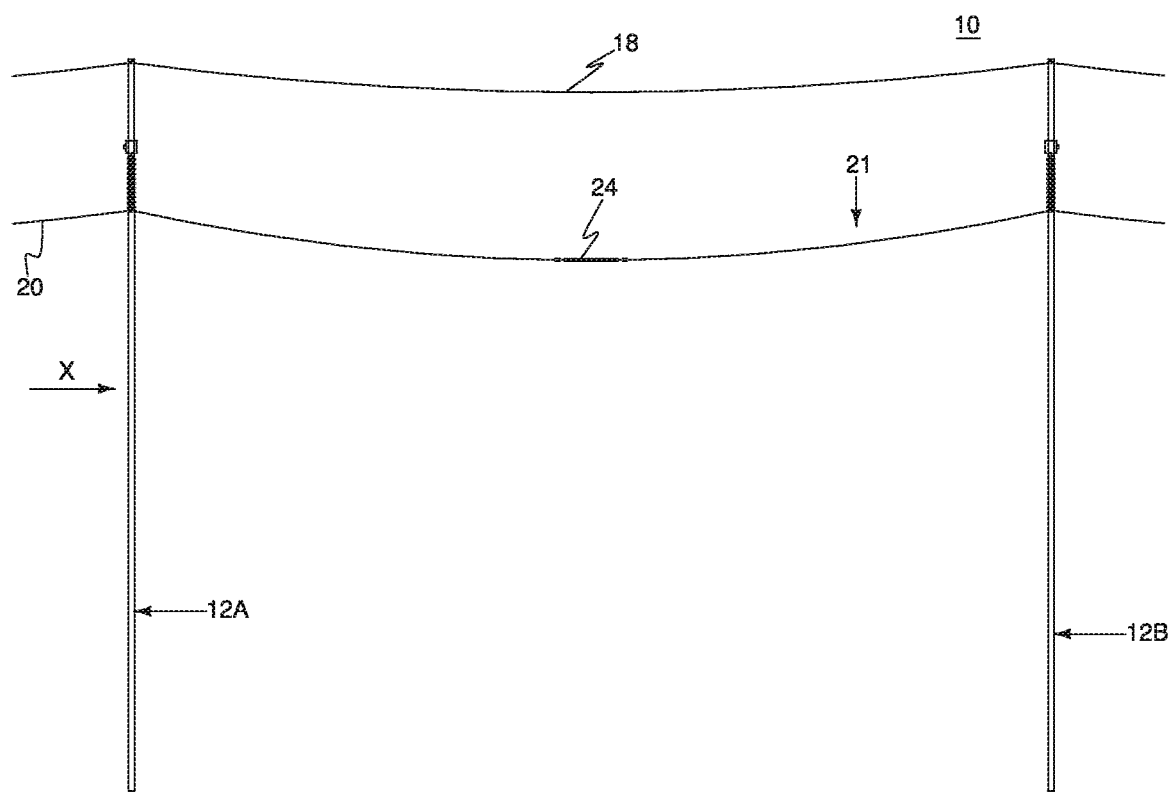
FIG. 10 is the diagrammatic, side elevation view of FIG. 9 showing the first boom mounted breaker removed from the section of the overhead power line system.

FIG. 8 depicts a step of disconnecting the jumper 22 from the conductor 20 so that the current load within the section 10 flows through the second alternate circuit 128. FIG. 9 depicts a step of actuating the first breaker 100 back into the open position. This step generates a de-energized portion 21 of the conductor 20 that is downstream of the first breaker 100. FIG. 10 depicts a step of disconnecting the conductive connection wires 118, 119 from the conductor 20 and moving the first breaker 100 into a position that is away from the conductor 20. For example as illustrated the first breaker 100 may be moved completely away from section 10.

The first breaker 100 is rated to meet the voltage and current specifications of the system 1000. In one embodiment, the first breaker 100 is selected from known circuit breakers such as, but not limited to, magnetic breakers, thermal magnetic breakers, and live tank breakers, such as sulfur hexafluoride ($SF_6$) breakers all of which provide intentional actuation between the open and closed positions, as would be appreciated by one skilled in the art. As seen in FIG. 9 by way of example, a power cord 108a runs through travellers 108e on the boom 101 from the actuating mechanism in boom-mounted control box 108 to a circuit breaker open/close control box 108b at the ground level. The control box 108b may for example be mounted on a support truck (not shown). Another power cord 108c runs between the circuit breaker open/close control box 108b and a generator 108d similarly located on or near the ground level, for example on the support truck, etc.

Figure 11:
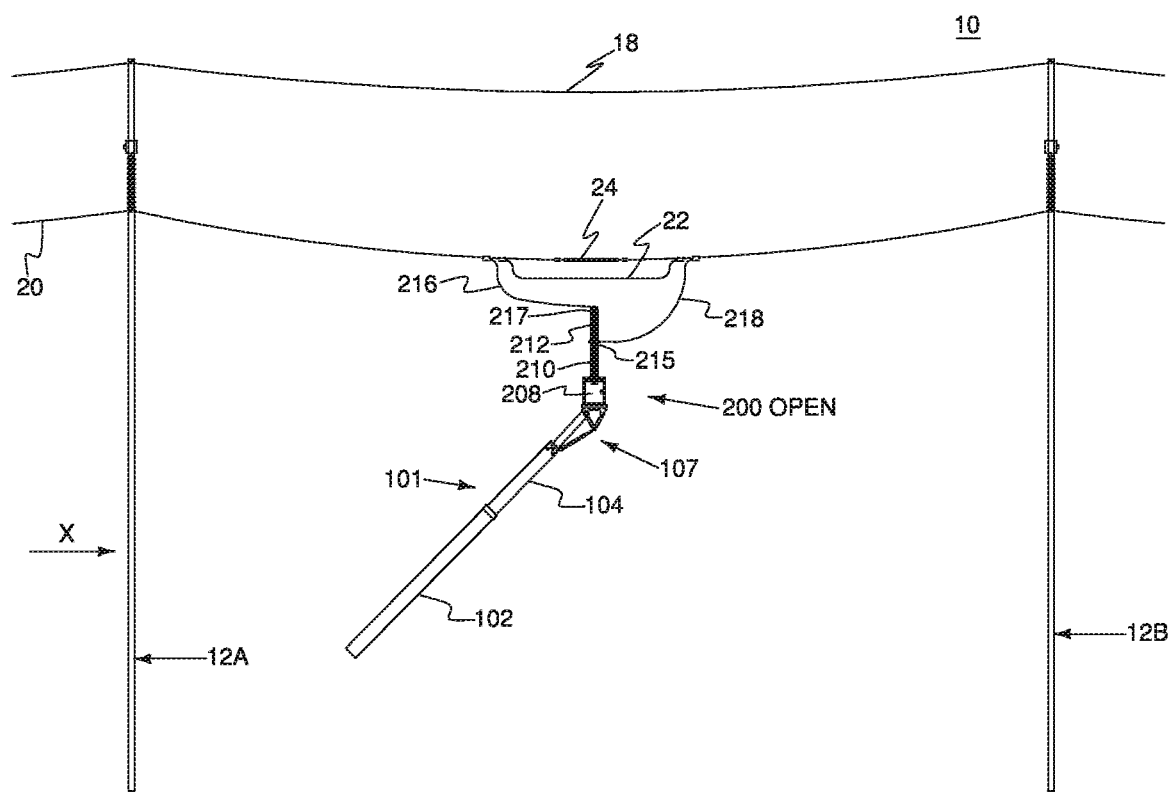
FIG. 11 is the diagrammatic, side elevation view the section of the overhead power line system of FIG. 4 showing the connecting of the conductor to the second boom mounted breaker, which is in an open position.
Figure 16:
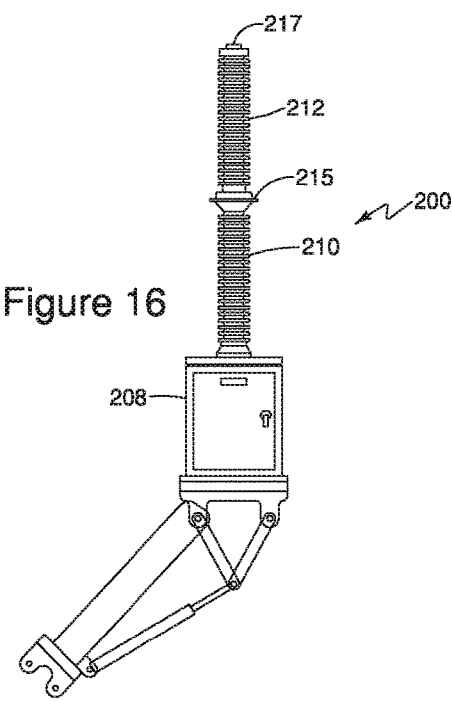
FIG. 16 is a side elevation view of the second boom mounted breaker.

FIG. 11 depicts another embodiment of the present invention that utilizes a second breaker 200, better seen in FIG. 16, instead of the first breaker 100. FIG. 11 depicts the section 10 with the same features described above regarding FIG. 5 with the difference between FIG. 5 and FIG. 11 being the use of the second breaker 200. FIG. 11 depicts the second breaker 200 mounted on the support base 106 upon the boom 101. The second breaker 200 can be actuated between a closed position and an open position. When in the closed position the first breaker 200 comprises electrical contacts that are in direct contact with each other and can conduct the electric current that is flowing through the section 10 without generating unacceptable amounts of resistance or heat. When in the open position, the electrical contacts within the second breaker 200 are physically separated and any arcing therebetween has been suppressed so that the second breaker 200 acts as an electrical insulator that does not conduct electric current.

One embodiment of the second breaker 200, which is shown in a corresponding magnified view in FIG. 16, comprises a housing 208, a support insulator 210, a breaking unit 212 with a primary terminal 215, 217 at each end of the breaking unit 212 (see FIG. 16). This embodiment of the second breaker 200 may also be referred to as an "I breaker". The features of the second breaker 200 perform the same functions as those described above regarding the first breaker 100. For example, the housing 208 houses a mechanism for actuating the second breaker 200 between the open and closed positions. The support insulator 210 insulates the breaking unit 212 from ground. The breaking unit 212 houses the electrical contacts and the mechanical components that couple the electrical contacts with the mechanism within the housing 208. As with the breaking unit 112, the breaking unit 212 may comprise an extinguishing mechanism for extinguishing any arcing between the electrical contacts when the second breaker 200 is actuated to the open position. For example, the extinguishing mechanism may be a $SF_6$ puffer design, a $SF_6$ self-blast design or other types of known extinguishing mechanisms.

As depicted in FIG. 11, the second breaker 200 is electrically connected to the conductor 20 on either side of the jumper 22 by conductive connection wires 216, 218. The second breaker 200 is in the open position in FIG. 11.

Figure 12:
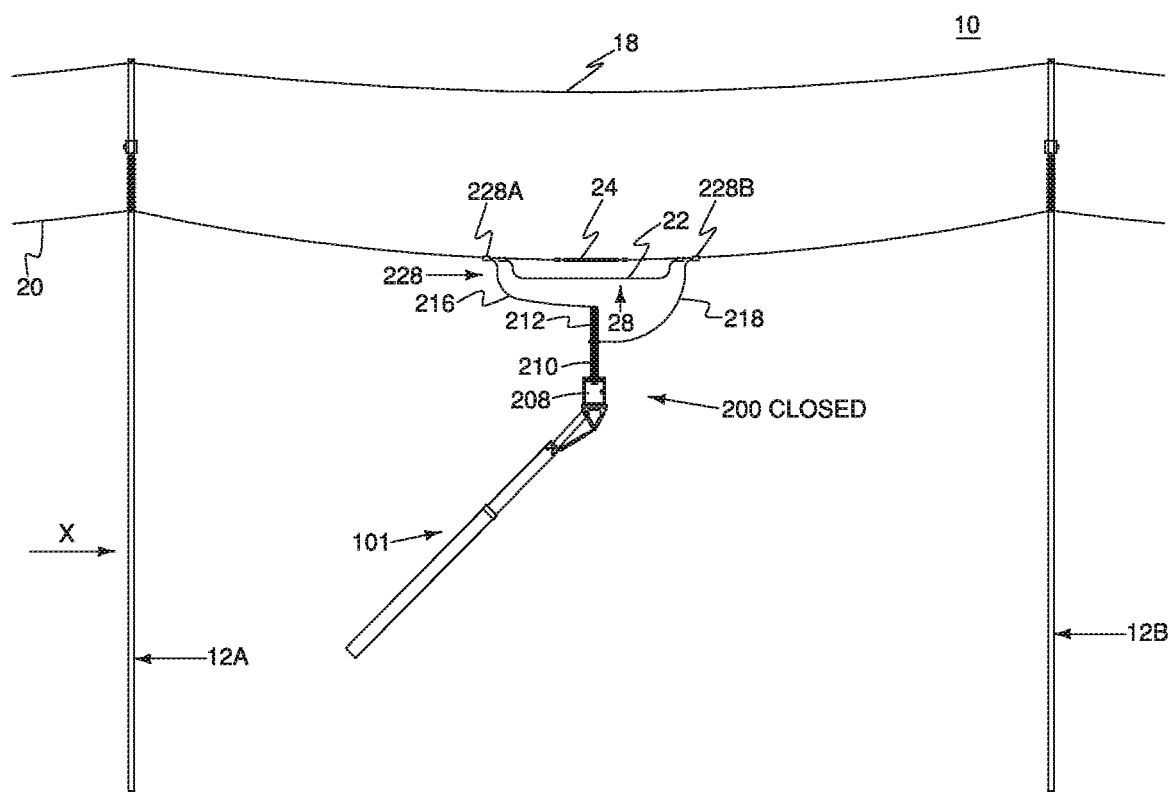
FIG. 12 is the diagrammatic, side elevation view of FIG. 11 showing the second boom mounted breaker in a closed position.

FIG. 12 depicts a step of actuating the second breaker 200 to the closed position, which creates a third alternate circuit 228. The third alternate circuit 228 has an upstream end 228A and a downstream end 228B. The third alternate circuit 228 is parallel to the first alternate circuit 28 and a portion of the current load in the system 10 diverts around the first alternate circuit 28 and the inline opener 24.

Figure 13:
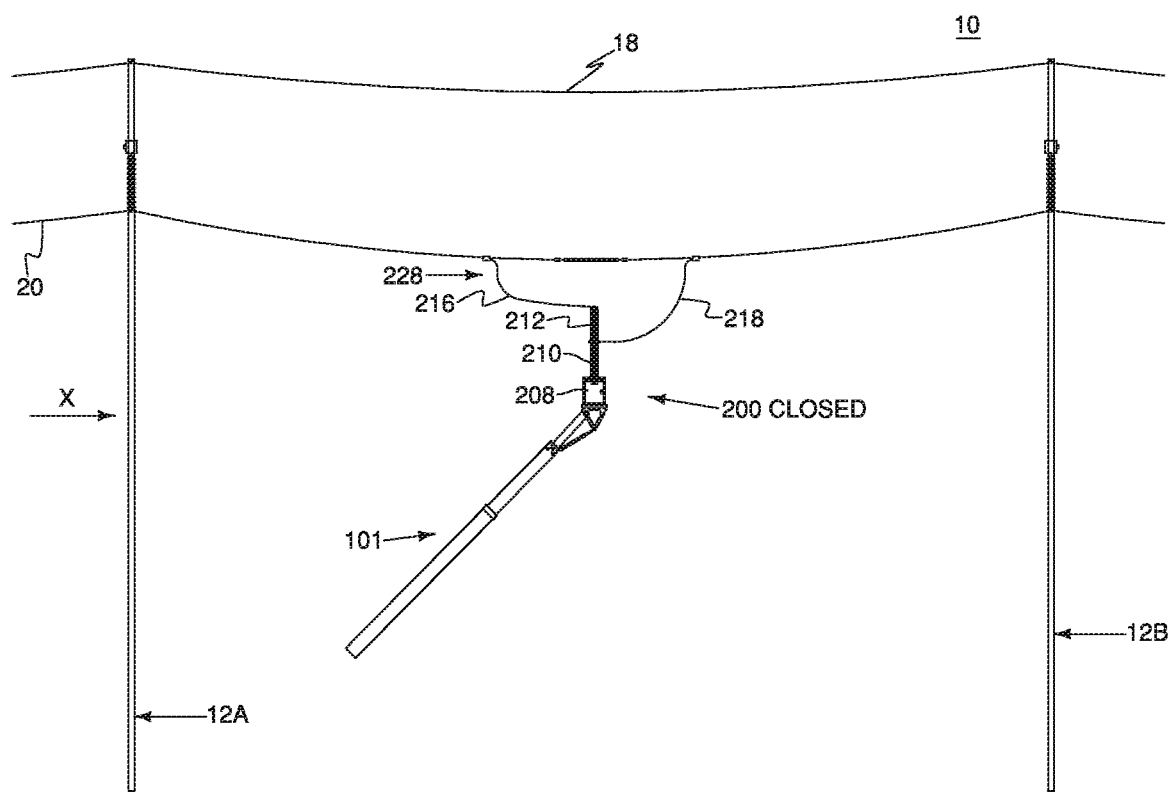
FIG. 13 is the diagrammatic, side elevation view of FIG. 12 showing the removal of the jumper line.

FIG. 13 depicts a step of disconnecting the jumper 22 from the conductor 20. The second breaker 200 is still in the closed position so that the current load within the section 10 flows through the third alternate circuit 228.

Figure 14:
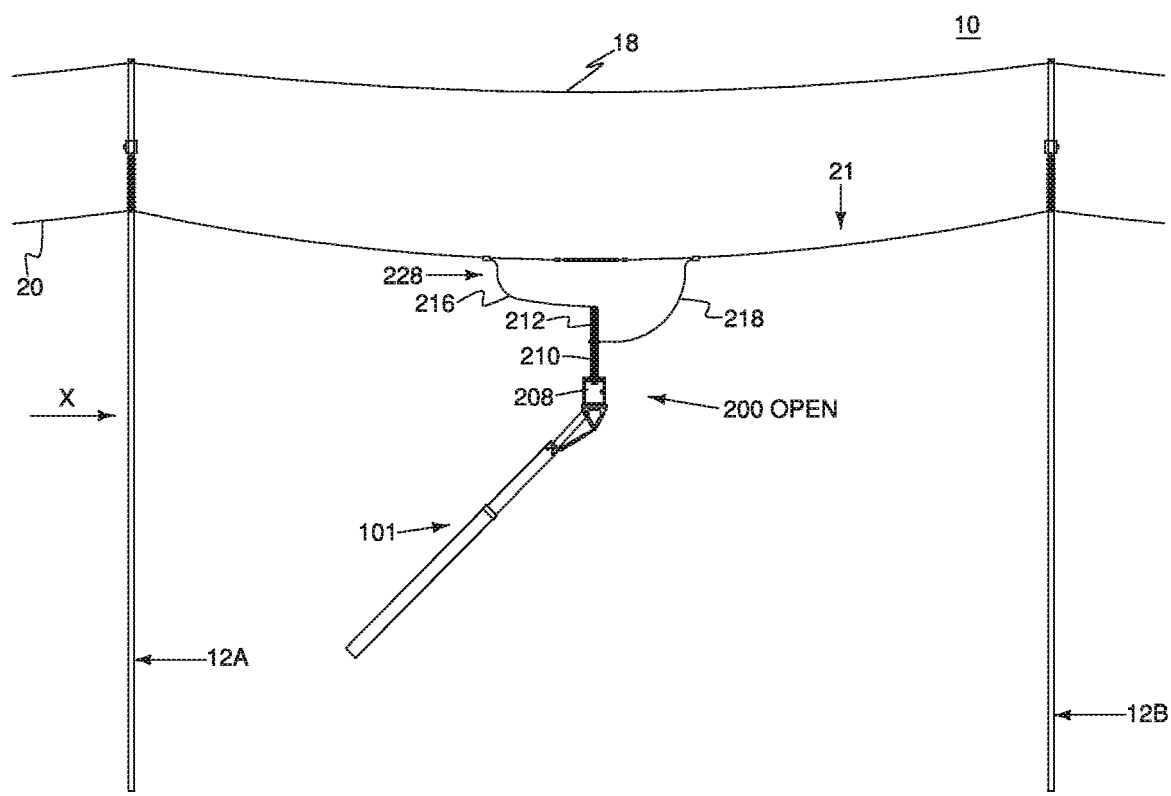
FIG. 14 is the diagrammatic, side elevation view of FIG. 13 showing the second boom mounted breaker in the open position.

FIG. 14 depicts a step of actuating the second breaker 200 to the open position. This stops the conduction of the current load through the second breaker 200 resulting in the de-energized portion 21 of the conductor 20 downstream of the second breaker 200. As described above regarding the first breaker 100, the second breaker can then be disconnected from the conductor 20 and moved to a position that is away from the conductor 20. This leaves the section 10 with a portion of live conductor 20 and a de-energized portion 21.

While the above disclosure describes certain examples of the present invention, various modifications to the described examples will also be apparent to those skilled in the art. The scope of the claims should not be limited by the examples provided above; rather, the scope of the claims should be given the broadest interpretation that is consistent with the disclosure as a whole.

The invention claimed is:

1. A boom mountable breaker system adapted for location in proximity to an energized section of an overhead power transmission line, and mountable onto an extendible and retractable boom having a distal end, the boom mountable breaker system comprising:
   a) a support base adapted to be pivotally connected to the distal end of the boom;
   b) a breaker having a support insulator having opposite upper and lower ends and at least one electrically insulating breaking portion having spaced apart electrical connectors thereon, the electrical connectors being configured for mounting of electrically conductive cables thereto,
   c) a control box mounted so as to cooperate between the insulators and the support base, and
   wherein, when the support base is pivotally connected to distal end of the boom with the at least one insulating breaking portion mounted to the upper end of the support insulator, and the lower end of the support insulator mounted to the support base, the breaker is remotely actuable between open and closed positions through the control box, and wherein, when in the closed position the breaker is an electrical conductor and when in the open position the breaker is an electrical insulator.

2. The boom mountable breaker system of claim 1 wherein the at least one insulating breaking portion has an upstream breaking portion and a downstream breaking portion, and wherein the upstream and downstream breaking portions are co-axially aligned with each other along a common longitudinal axis and are substantially perpendicular to the support insulator.

3. The boom mountable breaker system of claim 1 wherein the breaker is chosen from the group comprising: a T-breaker, an I-breaker.

* * * * *